Figure 2:
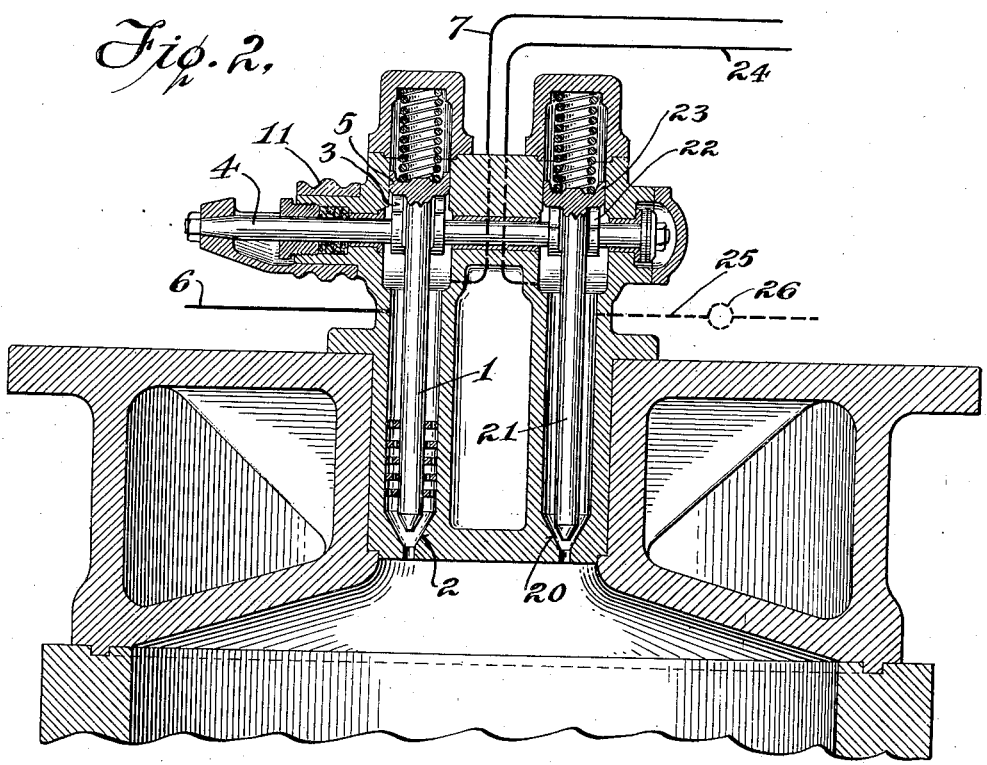

May 19, 1931.  E. KÄGI  1,805,698
INTERNAL COMBUSTION ENGINE
Filed March 14, 1922   2 Sheets-Sheet 1
Fig. 1,
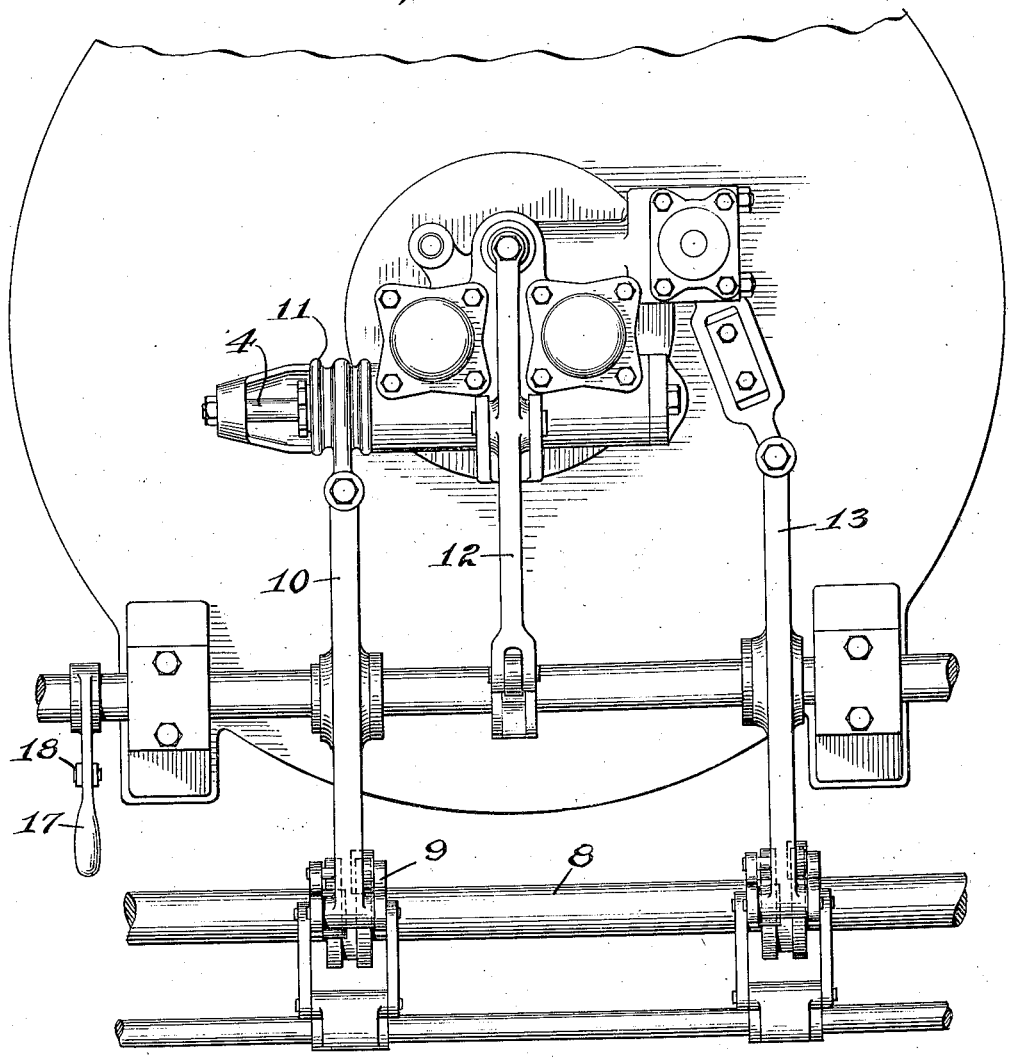
Fig. 4,
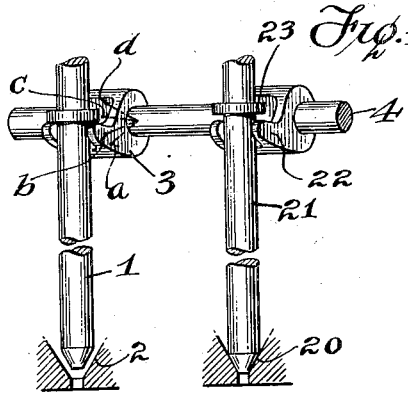
Fig. 5,
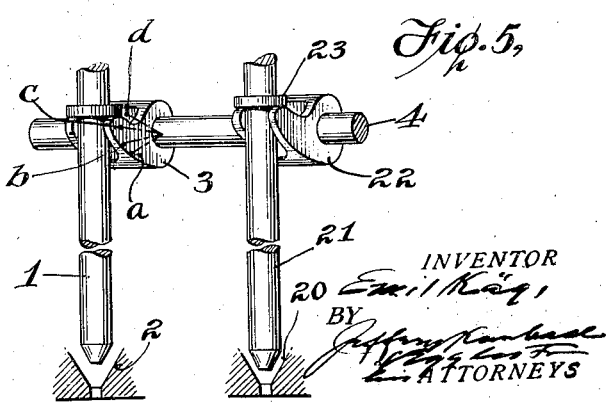

May 19, 1931.  E. KÄGI  1,805,698
INTERNAL COMBUSTION ENGINE
Filed March 14, 1922   2 Sheets-Sheet 2

INVENTOR
Ernst Kägi
BY
Jeffrey Kimball
ATTORNEYS

Patented May 19, 1931

1,805,698

UNITED STATES PATENT OFFICE

EMIL KÄGI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI

INTERNAL COMBUSTION ENGINE

Application filed March 14, 1922, Serial No 543,784, and in Switzerland March 21, 1921.

My invention relates to variable speed internal combustion engines and especially engines of the fuel injection type, such as Diesel engines, and is directed toward maintaining the proper proportions of air and fuel in the engine charges under different engine speeds. It is desirable, generally speaking, when the fuel injections in such engines are enlarged, to enlarge the amount of air put into the cylinder for each working stroke to a like degree, as otherwise, in some part of its operating range, the efficiency of the engine will be less than the maximum because of an undue excess of air or fuel. Arrangements have heretofore been proposed for enlarging the air charges to correspond to the enlarged fuel charges called for in consequence of an increasing load on the engine, and vice versa, for reducing the air charges when the fuel charges are reduced in consequence of a reduction of the load. Thus for example, it has been proposed to add more air by increasing the lift of the air-atomizing fuel injection valve in accordance with increased load, and while this arrangement may suffice to secure substantially the desired proportions under load changes so long as the speed of the engine is maintained constant, or nearly so, it is found insufficient for maintaining desirable proportions throughout the speed range of variable speed engines, for at low speeds the valve is held open for longer periods than when the speed is high, and hence more air is let into the cylinder each time the valve is opened at low speeds than at high speeds, although the length of lift or stroke of the valve may be alike in both cases. Accordingly, if arrangements are made to supply just sufficient air at some low speed, the engine receives an insufficient amount of air at higher speeds, or if sufficient air is supplied at a high speed, at a lower speed the engine receives an excess of air. Such devices therefore are not sufficient for engines required to operate at widely varying speeds, like the propelling engines of ships, where not only is the load changeable but the speed requirements also vary throughout the wide range, and especially with large and high speed units it is difficult to obtain satisfactory combustion at all loads and all speeds by any known method.

One of the objects of my invention is to provide sufficient air to combine with the fuel efficiently at high speeds without having an excess at low speeds, by changing the rate of flow of air into the cylinders as the engine speed changes, increasing the rate as the speed rises and reducing it as the speed falls, and this I do by supplying additional air at the higher speeds through a passage other than the passage in which the normal fuel charge is atomized. Obviously this additional supply may be brought about and measured in various ways, as by means of one or more air inlet passages additional to those commonly found on engines, these additional passages being opened only when the speed rises to a predetermined value, or being opened successively, or to a greater extent as the speed attains higher values, or by increasing the rate of flow through a normal air intake passage as by changing the extent of opening of a valve in the passage, etc.

In its preferred form, the invention comprehends an inlet valve for admitting compressed air to the cylinders at the beginning of or during the working stroke. This additional air may compensate for speed changes, or load changes, or may be used to increase the amount of fuel that may be burned in a cylinder of a given size and hence increase the power of the engine regardless of speed and load variations.

The invention also comprehends certain other collateral features as hereinafter set forth.

Figure 3:
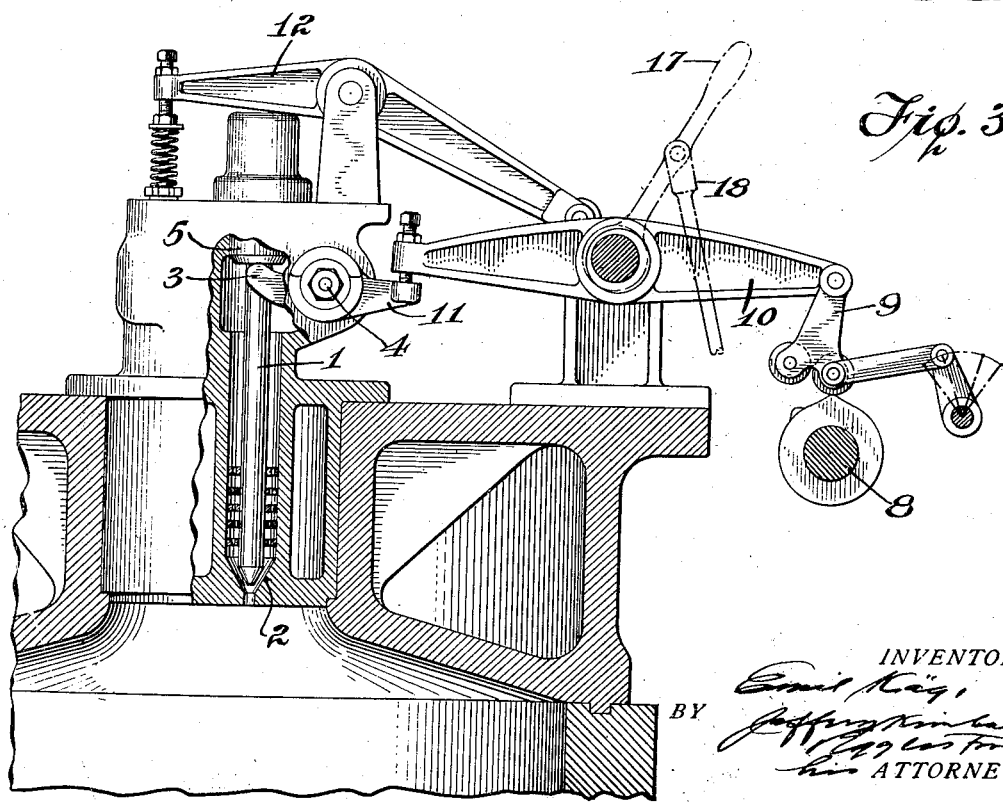

In the accompanying drawings, I have shown diagrammatically a single form of my invention embodied in what may be assumed to be a multicylinder variable speed 2-cycle marine or ship's propelling engine. Figure 1 is a plan view of a single cylinder of the engine. Figure 2 is a section of the top of the cylinder, showing the fuel valve and an added valve for the admission of air. Figure 3 is a sectional elevation at right angles to Fig. 2. Figures 4 and 5 show the fuel and added air valve in different positions.

1 is the needle of the usual atomizing fuel injection valve, 2 its seat in the valve casing and 3 the needle lifting lever, the latter being fixed to the rock shaft 4 and bearing underneath the collar 5 of the needle. A fuel pump delivers measured quantities of liquid fuel to the fuel injection valve through the pipe indicated at 6 and as the needle 1 is lifted, air, supplied to the valve through the pipe indicated at 7 from a source of air under suitably high pressure, drives the measured fuel into the cylinder or combustion space of the engine and atomizes it. The shaft 4 is rocked by a cam on the cam shaft 8, acting through the link 9 hung on the valve lever 10, which latter presses on a working lever 11 fixed on the end of shaft 4, and thus opens the valve 1 and furnishes a charge of fuel to the engine on each working stroke, together with some air. Air-starting valve levers are shown at 12 and 13. All these parts are diagrammatically shown and may be constructed in the usual manner. The other parts of the engine may be assumed to be of a well-known form and hence require no description.

The valve lever 10 rocks on an eccentric on the control shaft 16, which may be turned in its bearings by a handle 17 to change the lift of the fuel valve needle 1 in a well-known manner; the handle 17 may also be connected to the fuel pump by means of the link 18 so as to change the fuel measurement simultaneously with the change of valve lift. By means of this gearing, the rocking motion of shaft 4, and accordingly the lift of the valve 1, may be changed with the load of the engine in such a way, for example, that when there is no load or only a light load on the engine, the lever 3 swings between the points $a$ and $b$ (Fig. 4), when about half load on the engine, the lever swings between the points $a$ and $c$ and at full load between the points $a$ and $d$ (Fig. 5). Conforming to the extent of the swing of the lever 3 the length of stroke of the needle 1 is changed so that (the speed of the engine remaining the same) comparatively little air is passed into the engine through the injection valve at low engine loads, more at medium loads, and still more at full loads. When the engine speed changes however, the amount of air passed into the cylinder through the injection valve also changes, for each time the valve is opened at low speeds, it is held open for a longer period of time than at high speeds. Accordingly at low speeds, each charge of fuel and air contains more air than at high speeds, as pointed out before, that is to say, at low speeds more air accompanies a charge of any quantity of fuel than accompanies a charge of the same quantity of fuel at high speeds.

To overcome this effect of change of speed, which is felt especially on large marine engines where the load changes whenever the speed changes, I have provided in the instance shown the air passage 20, controlled by the needle valve 21 in addition to the other air passages and valves of the engine. Air is supplied to the passage 20 by the pipe at 24 and so far as necessary or desirable, the construction of the valve 20—21 may be substantially like that of the fuel injection valve. In this instance, since the load on the engine is assumed to change with the engine speed, the valve 21 may be actuated by a lever 22 that is also carried by the shaft 4, which carries the lever 3; the lever 22 engages beneath the collar 23 on the valve stem 21. The collar 23 is so arranged, however, that the valve 21 is not raised until the shaft 4 rocks so far that the lever 3 swings beyond the point $c$, that is to say, when the engine operates on at least half load. For smaller loads therefor, the valve 21 is not lifted but holds the passage 20 closed at all times (Fig. 4). For loads over half load however, the valve 21 is lifted (to an extent corresponding to the degree of load) during each working stroke, and air additional to that entering the other ports is then supplied to the cylinder through the passage 20 (Fig. 5) and the total rate at which air flows into the cylinder correspondingly increased. Since, in the example chosen to illustrate the invention, the passage 20 and valve 21 are arranged to supply air to the cylinder near the beginning of and during the working stroke it is necessary that the air supplied through the pipe 24 be under a pressure sufficiently high to pass into the cylinder against the pressure within the cylinder. I prefer this arrangement.

The dimensions of the passage 20 and the valve 21 are such that the air admitted through this passage substantially compensates for the change in speed and the shortened duration of opening of the cylinder ports, which accompanies increase in speed, and so that the total air in the cylinder bears substantially the desired efficient ratio to the fuel charge throughout the whole range of engine operation. It is possible by such means, even for large high speed marine engines, to provide the engine with an amount of air substantially correctly measured for all loads and speeds and thereby secure substantially complete combustion at all loads without undue excess.

The valve 20—21, if desired, may be constructed as a fuel valve and utilized for the injection of a part of the fuel at the higher loads, fuel being supplied to the valve from a pump through a pipe at 25. Overflow of the fuel at this valve while the valve remains closed during low speeds, may be prevented by suitable means 26 which, for example, may be controlled by the valve gearing in such a manner as to permit the supply of fuel to the valve at such times as the valve is supplying air to the cylinder, while preventing the supply of fuel to the valve at those low speeds during which the valve remains closed. Such blocking or diverting means for the fuel may also prevent the supply of fuel to this valve 20—21 while the engine is operating at some of the higher speeds for which the valve admits air to the cylinder; that is to say by such an arrangement the valve may be utilized for certain loads, or periodically, for the injection of air only while at other loads or at other times, it may be used to inject both air and fuel.

It will be understood that it is not an essential part of the invention that the valve 21 be operated by the same gearing as actuates the fuel injection valve 1; likewise, it is not essential that the valve controlling the additional air correspond to the fuel injection valve in construction as indicated in the accompanying drawings. These, as well as other details referred to in describing the particular embodiments of the invention illustrated are subject to modification as will be apparent.

Claims:

1. In an internal combustion engine, an inwardly closing air and fuel admission valve, an air admission valve, a cam shaft, a valve operating rock shaft operated by said cam shaft, and a valve lifting lever on said rock shaft for each of said valves.

2. In an internal combustion engine, a variable stroke fuel injection valve, a valve for admitting air to the engine cylinder when the fuel valve is operating and common means for operating both valves, said means operating said air valve to open it to admit air when the fuel valve is operating with an enlarged stroke but permitting said air valve to exclude air when the fuel valve is operating with a smaller stroke.

3. The method of operating an internal combustion engine having an air inlet passage or passages and a fuel injection valve, which consists in supplying compressed air through an additional air inlet passage during the working strokes at high speeds in amounts to compensate for decreased supply through the first mentioned air inlet passage or passages at high speed, and discontinuing the supply of air through said additional passage at low speeds.

4. In a variable speed internal combustion engine, a variable-lift fuel injecting valve, a second lift valve, both connected to a source of compressed air and said second valve controlling flow of air from said source, a common rock shaft to operate both valves, and a valve gearing to rock said shaft and adjustable to vary the rocking thereof, said second valve being opened by said rock shaft only when the lift of the fuel valve exceeds a certain value.

5. In a variable speed internal combustion engine including an air inlet passage or passages and a fuel injection valve, said air passage or passages supplying sufficient air to consume the fuel at low speeds, an additional air inlet passage, and means whereby said passage is opened to supply air at higher speeds to compensate for reduced air supply through the first mentioned air passage or passages at such higher speeds but is maintained closed at lower speeds.

6. In an internal combustion engine having a fuel injection valve and means for introducing combustion air, another passage for the admission of combustion-sustaining air, and means for decreasing the flow of air into the cylinder through said another passage, as the speed of the engine is decreased, to an extent substantially compensating for the increase in the amount of air entering the cylinder through the first mentioned air introducing means which accompanies decreasing speed.

7. In an internal combustion engine including an air inlet passage or passages for supplying air at all loads on the engine, an additional air inlet passage for supplying compressed air in amounts tending to maintain constant proportions of fuel and air, and an engine driven valve in said additional passage for opening said additional passage during the working strokes while the engine is operating under higher loads.

8. In a variable speed internal combustion engine having a cylinder, a variable lift air atomizing fuel injection valve and a valve controlling the supply of compressed air to said cylinder, both valves being connected to a source of compressed air and controlling flow into the cylinder through separate ports therein, a common operating means for both valves and valve gearing for both valves by which said variable lift fuel valve is opened in advance of the other and by which said second valve is opened only when the lift of the first valve exceeds a certain value.

9. In a variable speed internal combustion engine having a cylinder, two inwardly closing air admission lift valves controlling flow into the cylinder through separate ports therein, both connected to a source of compressed air and one at least controlling the supply of combustion air from said source through its port, a fuel supply to the other of said valves, and means for opening said valves in sequence during the same piston stroke.

In testimony whereof, I have signed this specification.

EMIL KÄGI.